Jan. 26, 1965  D. A. DI TIRRO ET AL  3,167,084
TIMING VALVE

Filed Jan. 5, 1961  3 Sheets-Sheet 1

INVENTORS
DOMENIC A. DI TIRRO &
PAUL CARR
BY
J. O. Haney
ATTORNEY

INVENTORS
DOMENIC A. DITIRRO &
PAUL CARR
BY
*J. D. Haney*
ATTORNEY

INVENTORS
DOMENIC A DITIRRO &
PAUL CARR
BY
*J. D. Haney*
ATTORNEY

United States Patent Office 3,167,084
Patented Jan. 26, 1965

3,167,084
TIMING VALVE
Domenic A. Di Tirro, Silver Lake, and Paul Carr, Uniontown, Ohio, assignors to International Basic Economy Corporation, New York, N.Y., a corporation of New York
Filed Jan. 5, 1961, Ser. No. 80,772
10 Claims. (Cl. 137—269.5)

This invention relates to timing valves for timing the operation of fluid pressure-actuated equipment such as pneumatic piston motors and similar devices.

The valves of this invention effect a timing function by retarding or throttling the flow of pressure fluid into and/or out of such devices at a predetermined rate. These valves are especially useful for operating a series of such devices in a pre-arranged sequence. In general a timing valve of this invention is adapted to delay the actuation of an associated device for a determinable period following the communication of pressure to the device (a so-called "time-in" control function), or to delay de-actuation of the device following the communication of the device to exhaust (a so-called "time-out" control function). Ordinarily in a "time-in" control function, the device controlled by the timing valve responds slowly to the fluid pressure communicated to it, but on de-actuation it responds quickly. The reverse is true in a "time-out" control function. In the latter case the controlled device is quickly actuated by the communicated fluid pressure, but its de-actuation response is very slow. The timing valves of this invention are also adapted for a "time-in, time-out" control function where the response of the controlled device is delayed both on actuation and on de-actuation.

The invention provides a timing valve which may be adjusted in a given installation very easily and simply to provide either "time-in" control, or "time-out" control, or both, for its associated device. Adjustment from one control function to another can be accomplished without disassembly of the valve or any change in the piping connections to the valve body, and such adjustment even can be made while the timing valve is under full operating pressure. For each particular control function, the valve is further adjustable to provide a wide range of timed periods.

The invention will be more fully described with reference to the accompanying drawings which show, by way of example, the structure of two preferred timing valves made according to and embodying the invention. In the drawings.

Figure 7:
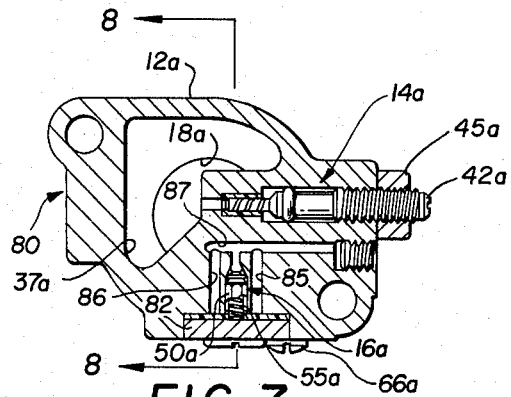
FIG. 7 is a cross section of another preferred timing valve.
Figure 8:
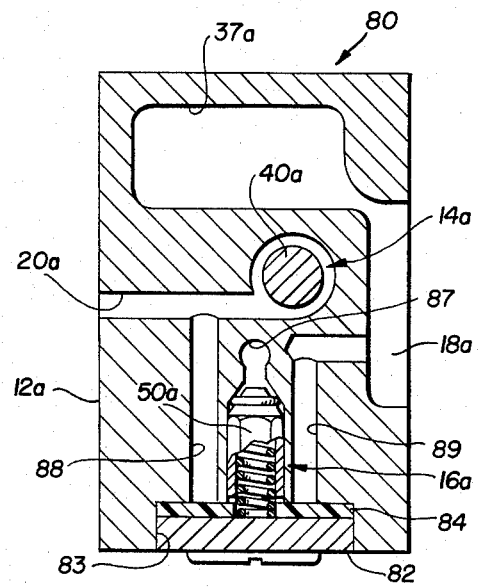
FIG. 8 is a sectional view taken on the line 8—8 of FIG. 7.
Figure 9A:
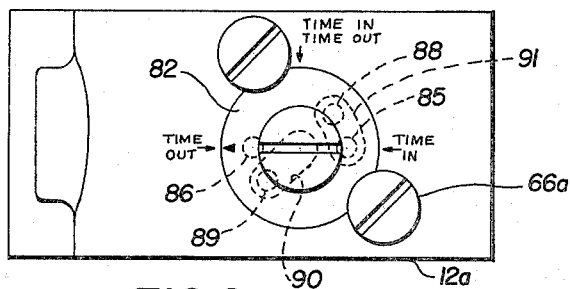
Figure 9B:
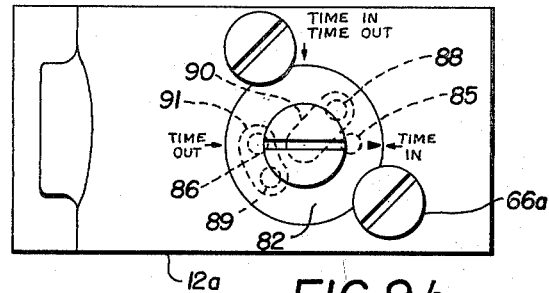
Figure 9C:
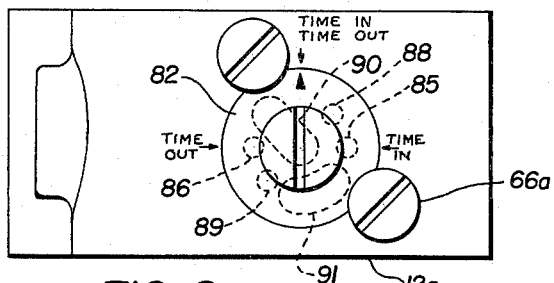
Figure 10:
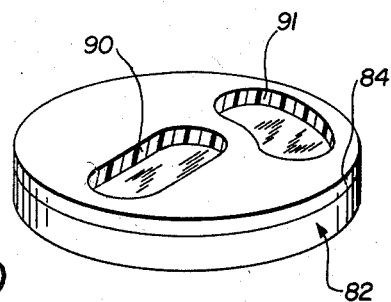

FIGS. 9a, 9b, and 9c are separate front elevational views of the valve of FIG. 7, showing the respective settings of the valve for a "time-out" function, a "time-in" function, and for a "time-out, time-in" function; and FIG. 10 is a perspective view of the adjusting means of the timing valve of FIGS. 7–9.

Figure 1:
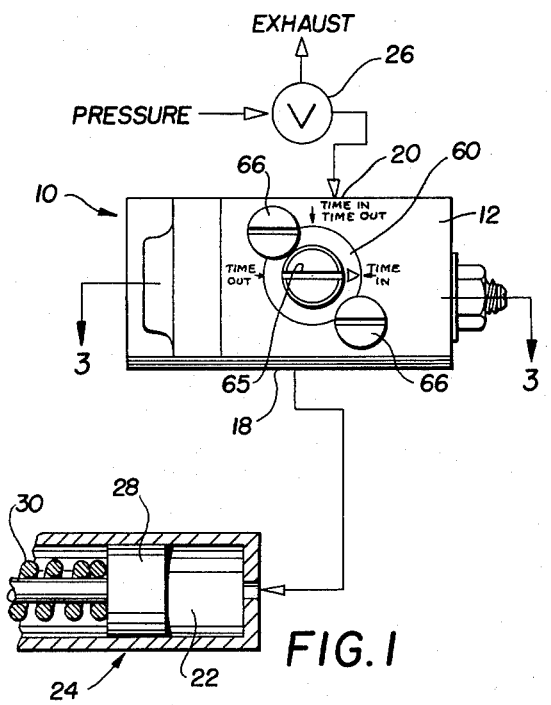
FIG. 1 is a front elevation of one preferred timing valve with fluid pressure connections shown diagrammatically to a fluid pressure actuated piston motor associated with the timing valve.
Figure 2:
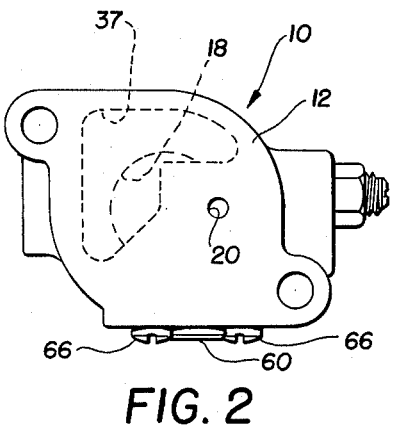
FIG. 2 is a top view of the timing valve of FIG. 1.
Figure 3:
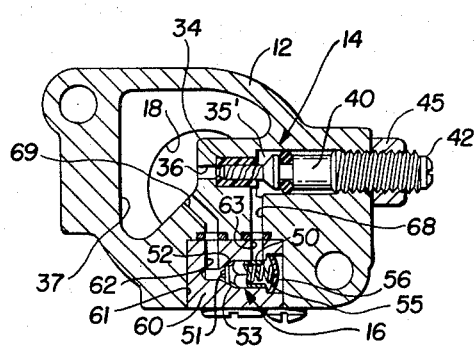
FIG. 3 is a cross section through the valve on the line 3—3 of FIG. 1, and showing the valve adjusted for a "time-in" control function.

Referring to FIGS. 1–6, the main structural components of a timing valve 10 shown in these figures include a single integral body or casing 12 in which there are two separate valve units, a fluid metering valve 14, and a one-way check valve 16 (see FIG. 3). These valve units are arranged in parallel with each other with respect to fluid flowing between a first port 18 in the bottom of the casing, and a second port 20 (FIG. 2) into the casing from its upper surface. In a typical installation of the timing valve as shown in FIG. 1, the first port 18 is connected so that it communicates with the expansion chamber 22 of a piston motor 24 or any similar fluid actuated device. The second port 20 is ordinarily connected through a suitable three-way flow control valve 26 to a pressure source and to an exhaust receiver. When control valve 26 is shifted to its pressure position, fluid pressure is directed into casing 12 through port 20, and then through the timing valve 10, and through port 18 into chamber 22 to shift piston 28 leftward. Thereafter, when valve 26 is shifted to its exhaust position, the fluid pressure in chamber 22 is exhausted through the timing valve 10, the flow being from port 18 toward port 20, and piston 28 being moved rightward by its biasing spring 30.

The metering valve 14 has a cylindrical shank 32 (see FIG. 6) in which there is a shallow V-shaped groove 33 in its surface extending spirally along the shank. The shank is fitted closely inside an annular sleeve or bushing 34 preferably of a plastic such as nylon, which is seated near the inner end of a passage 35 open to one side of the body 12. Near the bushing 34, the inner end of passage 35 is communicated by a port 36 with an accumulator chamber 37 (FIG. 3) inside the body. The motor port 18 is in communication with chamber 37.

The shank 32 of the metering valve is integral with a mounting stud 40 which extends through passage 35 and which is in threaded engagement at 41 near the open mouth of passage 35 at the side of the body. The outer end of stud 40 has a slot 42 so that the mounting stud may be threaded axially of passage 35 by a suitable tool to adjust the length of shank 32 and spiral groove 33 embraced by sleeve bushing 34. An O-ring 44 sealingly encircles the portion of stud 40 near its threaded region 41 and engages the side of passage 35 to prevent fluid leakage through the threads 41 to the outside of the body. The mounting stud 40 may be locked in any position of axial adjustment by an external locking nut 45 engaged with the portion of the stud projecting beyond body 12.

Port 20 (FIG. 2) in the upper side of the body 12 communicates with a region 35' of passage 35 in the metering valve between shank 32 and O-ring 44. Accordingly, fluid pressure communicated to port 20 is introduced into region 35', but is retarded by the engagement of shank 32 with bushing 34 from flowing freely to port 36 and the accumulator chamber 37. Instead the fluid pressure in chamber 35' leaks through the spiral groove 33 along the shank 32 and thus passes at a controlled rate through port 36 into accumulator chamber 37. Conversely, if the accumulator chamber 37 is pressurized (as when motor 24 is actuated), and port 20 is communicated to exhaust, then the fluid in chamber 37 can leak in the reverse direction through spiral groove 33 into region 35' and then through port 20 to the outside of the timing valve and to valve 26.

The rate of flow of fluid through the metering groove 33 can be increased by threading stud 40 along thread 41 to withdraw shank 32 from bushing 34. The flow rate is decreased by threading stud 40 in the opposite direction to project shank 32 deeper into bushing 34. Such adjustment changes the effective length of the spiral groove 33 through which the fluid is metered. Preferably the tip of shank 32 is tapered slightly to mate with a beveled seat 47 at the inner end of bushing 34, so that when the stud 40 is threaded into passage 35 to engage this tip with seat 47, flow is entirely stopped through groove 33.

The check valve 16 includes a valve head 50 having a tapered forward face encircled by an O-ring 51. The head 50 is of square cross section and fits slidably into a cylindrical chamber 52 having a tapered annular seat 53 engageable with an annular sealing ring 51 on the front end of valve head 50. The valve head 50 is normally biased toward a closed position on seat 53 by a spring 55 held in the mouth of chamber 52 by a lock disc 56. The corners of the head 50 engage the sides of chamber 52 so that fluid can pass between the sides of the valve head and the chamber when the head is moved away from seat 53.

The chamber 52 is formed in a cylindrical adjusting member 60 which fits closely inside a mating cylindrical socket 61 in one side of the valve body 12. The portions of chamber 52 on opposite sides of seal ring 51 are connected by ports 62 and 63 to the inwardly directed side of cylindrical member 60. The outside surface of member 60 (FIG. 1) has a slot 65 to receive a tool for rotating member 60 inside socket 61. Member 60 is retained in socket 61 by two locking screws 66 which are threaded into the body 12 with their heads overlapping the periphery of the outside of member 60. Screws 66 are arranged so that they may be tightened against the member 60 to lock it against rotation in socket 61. To adjust member 60 rotatably in socket 61, the screws 66 are first loosened and then member 60 is turned to the desired position by a tool inserted in slot 65. Then the screws 66 are retightened to lock member 60 in its new position.

When the cylindrical member 60 is adjusted to orient the check valve 50 to the position in FIG. 3, port 63 on the larger side of valve head 50 registers with a lateral port 68 which extends from the bottom of cylindrical opening 61 to the region 35′ in passage 35 of the metering valve 14. Similarly, port 62 at the smaller side of valve head 50 registers with another port 69 leading from the bottom of opening 61 to the accumulator chamber 37.

With this position of check valve 50, it is evident that when valve 26 (FIG. 1) is operated to admit fluid pressure into port 20, the pressure entering chamber 35′ of the metering valve is communicated through ports 68 and 63 to check valve chamber 52 so that such pressure acts against the larger area of head 50 and cooperates with spring 55 to hold valve head 50 tightly closed. Thus the fluid pressure in chamber region 35′ can enter the accumulation chamber 37 only by leaking through metering groove 33. Accordingly piston motor 24 (FIG. 1) will be delayed in its actuation until sufficient fluid leaks through groove 33 into the accumulation chamber to raise the pressure in the accumulator chamber 37 and in the expansion chamber 22 of the piston motor 24 to an adequate level to overcome biasing spring 30 of the motor. Owing to the fact that the closed end of valve head 50 is smaller than the opposite side communicated to fluid pressure at the inlet 35a of the metering valve, valve head 50 remains tightly closed, even when the pressure in the accumulator chamber increases to that of the line pressure.

When control valve 26 (FIG. 1) is shifted to its exhaust position, while check valve 50 is oriented as in FIG. 3, the fluid in inlet chamber 35′ of the metering valve and on the larger side of valve head 50 is exhausted immediately through valve 26. Accordingly, the pressure in the accumulator chamber 37 acts through ports 69 and 62 against the smaller side of valve head 50 to force this valve open against its biasing spring 55. Hence the pressure in the accumulator chamber (and in the expansion chamber 22) is quickly exhausted past open valve head 50 and via ports 63, 68, chamber 35′, and port 20.

The foregoing mode of operation is characterized as a "time-in" control function because the actuation of motor 24 is delayed for a determinable period after valve 26 is operated to communicate line pressure to the timing valve. On the other hand, the piston motor is de-actuated through the timing valve almost simultaneously with the shifting of valve 26 to exhaust.

The front face of cylindrical member 60 has an arrow scribed thereon as shown in FIG. 1, which may be aligned with a corresponding bench mark on the body of the timing valve labelled "time-in" to signify the orientation of valve 50 as shown in FIG. 3.

A "time-out" control function is a mode of operation of the equipment in which piston motor 24 is actuated simultaneously with the operation of valve 26 in communicating line pressure to the timing valve, but the restoring or de-actuation movement of the piston motor 24 is delayed for a determinable period after the valve 26 is shifted to exhaust pressure from the motor 24.

Figure 4:
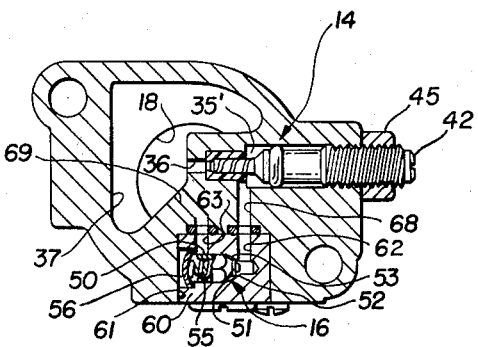
FIG. 4 is a cross sectional view like FIG. 3 but showing the valve adjusted for a "time-out" control function.

To obtain a "time-out" control function with valve 10, the locking set screws 66 are first loosened, and then cylindrical member 60 is rotated in its socket 61 through 180°, thereby reversing the position of the valve head 50, as shown in FIG. 4. In this new position of member 60, the arrow on the outside surface will be pointed to the notation "time-out" stamped on the front face of the valve body. Screws 66 are retightened to lock member 61 in its new position.

In the FIG. 4 position, fluid pressure entering port 20 and inlet chamber 35′ is communicated through ports 68 and ports 62 to the smaller side of head 50, thereby forcing open the latter. The incoming pressure thus bypasses metering screw 14 and flows quickly to the accumulator chamber 37 and port 18 via ports 63 and 69, to actuate motor 24 substantially immediately after valve 26 is operated. When valve 26 is then shifted to exhaust, the pressure in accumulator chamber 37 then acts through ports 69 and 63 to hold valve head 50 closed, while the fluid leaks through spiral groove 33 of the metering valve 14 and via chamber 35′ through port 20 to exhaust through valve 26. Therefore the exhaust flow is at a much slower rate than the inflow, thereby delaying the de-actuation of motor 24 for a determinable period.

Figure 5:
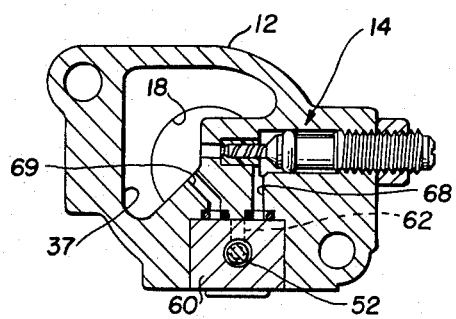
FIG. 5 is a cross sectional view like FIG. 3 but showing the valve adjusted for both a "time-in" and a "time-out" function.
Figure 6:
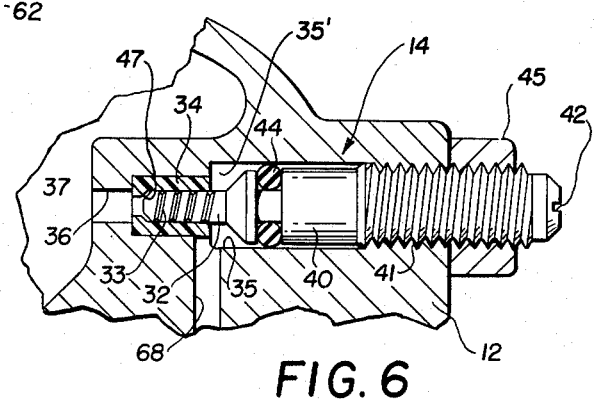
FIG. 6 is an enlarged detail view of the flow passage of the metering valve of the timing valve of the preceding figures.

If the member 60 is rotated only 90° to bring its arrow to the mark labelled "time-in, time-out" on the front face of the timing valve, the valve head 50 will be oriented as in FIG. 5 so that neither of its ports 62 or 63 register with ports 69 and 68 of the body. Therefore incoming pressure through port 20 is metered to the accumulator chamber through metering valve 14, and pressure in the accumulator chamber 37 is also metered through valve 14 in reverse direction to exhaust. Thus both the actuation response, and the de-actuation response of piston motor 24 is delayed following operation of valve 26.

Referring to FIGS. 7–9, the timing valve 80 shown in these figures is identical in its structure and mode of operation to the timing valve 10, except that timing valve 80 has a check valve 16a arranged in a fixed position in side body 12a, rather than being movable as in timing valve 10. As shown in FIG. 7, the valve head 50a is located in a valve chamber in the valve body 12a. The biasing spring 55a of check valve head 50a bears against the center of a relatively thin cylindrical plug 82 which fits into a shallow cylindrical socket 83 in the side of the body 12a. The bottom of plug 82 is attached to and covered with a thin plastic disc 84 which forms a seal between the plug and the bottom of socket 83. Plug 82 is retained in its socket 83 by locking screws 66a (FIG. 9a).

The smaller or closed side of valve head 50a is in communication with two ports 85 and 86 (FIG. 7) leading to the bottom of socket 83 through a cross port 87. Referring to FIG. 8, a port 88 communicates the bottom of socket 83 with inlet port 20a, and another port 89 communicates the bottom of socket 83 with accumulation chamber 37a and outlet port 18a.

The plastic sealing disc 84 (see FIG. 10), which is fastened to plug 82 by any suitable bonding agent, has two slots 90 and 91 formed therein in the side facing the bottom of socket 83. Slot 90 extends generally radially of the plug from its center. Slot 91 is arcuately shaped and is near the periphery of the disc.

The timing valve 80 is adjusted to its different timing functions by rotating plug 82 and disc 83 so that the order of communication of the several ports of the body 12a with the check valve 50a is changed while valve 50a remains stationary. This is to be distinguished from the timing valve 10 in which the check valve 50 is itself movable to effect an adjustment of the timing function.

To set the timing valve 80 for a "time-out" function, the plug 82 is rotated to a position as shown in FIG. 9a so that radial slot 90 communicates the larger side of valve head 50a to port 89 leading to accumulator chamber 37a. In this position the arcuate slot 91 links port 85 from the small side of valve head 50a to port 88 leading to inlet port 20a. Accordingly, fluid pressure entering port 20a goes directly to the metering screw 14a and is also communicated to the smaller side of valve head 50 via port 88, arcuate slot 91, and port 85 to open valve head 50a. The pressure then flows directly to accumulator chamber 37a via radial slot 90, and port 89 so that a piston motor is operated quickly. When port 20a is subsequently communicated to exhaust, fluid pressure in accumulation chamber 37a acts through port 89 and radial slot 90 to close valve head 50a. Hence the pressure in the chamber 37a is metered slowly through metering valve 14a, and is consequently slowly exhausted through port 20a.

To set timing valve 80 for a "time-in" control function, locking screws 66a are released and plug 82 is rotated in its socket 83 for 180° so that radial slot 90 of disc 84 communicates port 86 from the front or small side of valve head 50a to port 89 extending to accumulator chamber 37a. Incoming pressure through port 20a is then passed via port 88 and slot 90 to the large side of valve head 50a to hold this valve closed while such pressure is metered slowly through metering valve 14a. When port 20a is communicated to exhaust, the pressure in accumulator chamber 37a acts via ports 89 and 86 to open valve head 50a. Then this pressure is exhausted past valve head 50a, through radial slot 90 and port 83 into port 20a.

To obtain a "time-in, time-out" control function, plug 82 is rotated in its socket 83 for 90° to the position in FIG. 9c. Here neither radial slot 90 or arcuate 91 registers with the body ports leading to the check valve. Therefore fluid entering port 20a is metered through the metering valve 14a to chamber 37a, and is also metered out of chamber 37a in the reverse direction when port 20a is subsequently communicated to exhaust.

The delay interval may be varied in either of the foregoing timing valves 10 by adjusting the position of the stud 40 (or 40a in the embodiment of FIGS. 7–10). The delay interval is also a function of the size of the accumulator chamber 37 (37a) inside the valve body. This chamber is of fixed volume in any given valve. The timing valves may be installed with auxiliary accumulation chambers (not shown) to further increase the range of the timing interval available.

Variations in the constructions disclosed may be made within the scope of the appended claims.

We claim:

1. A timing valve comprising a body, a first port for communicating said body with a fluid motor, a second port to which fluid pressure is alternately directed to and exhausted from said body, a flow-metering valve intercommunicating said ports for controlling the rate at which fluid passes from one port to the other port, a one-way check valve in said body having an inlet and outlet adapted for interchangeable communication respectively with said ports in parallel relation with said metering valve, and a member seated in said body for rotation within the body in sealed engagement therewith on a fixed axis of rotation, said member having passages therein terminating on the member on a common circle about the rotational axis of said member for effecting said communication of said inlet and outlet with said first and second ports, said passages cooperating when said member is rotated on said axis for selectively interchanging the respective order of communication of said inlet and outlet of the check valve with said first and second ports depending on the particular rotational position of said member relative to said body, whereby with either selected order of communication the check valve is open to fluid flow in one direction between said ports but closed to reverse flow.

2. A timing valve according to claim 1 wherein said member includes means for selectively disconnecting said check valve from communication with either of said ports so that the flow between said ports in either direction is entirely through said metering valve.

3. A timing valve comprising means for mounting a flow-metering valve and a one-way check valve between a first port for communicating said valves with a fluid motor and a second port to which fluid pressure is directed into and exhausted from said valves so that fluid flowing between said ports is directed in parallel to both said valves, and a member seated in said body for rotation within the body in sealed engagement therewith on a fixed axis of rotation, said member having passages therein terminating on the member on a common circle about the rotational axis of said member, said passages cooperating for selectively communicating said one-way valve interchangeably with said first and second ports so that either (a) the check valve is closed to fluid flow from said second port toward said first port but opens to reverse flow between said ports, or (b) the check valve is open to fluid flow from said second port toward said first port but is closed to reverse between said ports, depending on the particular rotational position of said member relative to said body about said axis of the member.

4. A timing valve comprising a body, a first port for communicating said body wtih a fluid motor, a second port to which fluid pressure is directed to and exhausted from said body, a passage intercommunicating said ports, means in said passage for controlling the flow rate of fluid passing through said passage between said ports, a chamber in the body separate from said passage having an inlet and outlet region and a one-way check valve member in said chamber separating said regions, the inlet and outlet regions being adapted for interchangeable communication respectively with said first and second ports in parallel relation with said flow rate controlling means, and a member seated in said body for rotation within the body in sealed engagement therewith on a fixed axis of rotation, said member having passages therein terminating on the member on a common circle about the rotational axis of said member for effecting said communication of said inlet and outlet with said first and second ports, said passages cooperating when said member is rotated on said axis for selectively interchanging the respective order of communication of said inlet and outlet of the check valve with said first and second ports depending on the particular rotational position of said member relative to said body, whereby with either selected order of communication the check valve is open to fluid flow in one direction between said ports but closed to reverse flow.

5. A valve according to claim 4 and further comprising a pressure accumulator chamber of predetermined volume adjoining said first port.

6. A valve according to claim 4 wherein said chamber and check valve are integral with said body whereby said rotatable member is rotated relative to said check valve to effect the desired order of communication of said passages of said member with said regions of said check valve.

7. A valve according to claim 4 wherein said rotatable member includes said chamber and said check valve, said check valve being rotatable with said member to effect the desired order of communication of said passages of said member with said ports.

8. A valve according to claim 4 wherein said means for controlling the flow rate in said passage is a member closely fitted to the sides of said passage and defining with the sides of said passage a spiral groove through which said fluid flows.

9. A timing valve comprising a body, a first port for communicating said body with a fluid motor, an accumulator chamber in the body adjoining said first port, a second port to which fluid pressure is directed to and exhausted from said body, a passage in the body from said second port to said accumulator chamber, means in said passage for controlling the flow rate of fluid passing through said passage between said second port and said accumulator chamber, a cylindrical socket in said body open to one side thereof, secondary flow passages communicating said cylindrical socket with said accumulator chamber and with said second port, a cylindrical member in said socket rotatably engaging the walls thereof in sealing engagement therewith on a fixed axis of rotation, means retaining said member in said socket for rotary adjusting movement relative to said body, a check valve chamber in said cylindrical member including a check valve seat, a check valve head in said chamber normally biased toward a closed position on said seat, and passages in said cylindrical member communicating regions of said check valve chamber on opposite sides of said seat with said secondary flow passages in said body to said accumulator chamber and to said second port in an order corresponding to the particular rotational position to which said cylindrical member is adjusted in said socket, the passages in said cylindrical member and the secondary passages in said body terminating at mating surfaces of the cylindrical socket and the cylindrical member on a common circle about the axis of rotation of said cylindrical member.

10. A timing valve comprising a body, a first port for communicating said body with a fluid motor, an accumulator chamber in the body adjoining said first port, a second port to which fluid pressure is directed to and exhausted from said body, a passage in the body from said second port to said accumulator chamber, means in said passage for controlling the rate of fluid adapted to pass through said passage between said second port and said accumulator chamber, a check valve chamber in the valve body separate from said passage and including a valve seat therein separating said chamber into an inlet and an outlet region, a check valve head in said chamber normally biased to a closed position on said seat, a cylindrical socket in said body, a cylindrical member in said socket mounted for rotary adjustment therein relative to said body in sealing engagement therewith on a fixed axis of rotation, secondary passages in said body communicating said inlet and outlet regions of said chamber with said socket, and other secondary passages in said cylindrical member adapted to register with the aforesaid secondary passages in selected adjusted positions of said member in said socket, said cylindrical member being adapted for angular rotary adjustment in said socket about said rotational axis to selectively interchange the order of communication of the secondary passages of said cylindrical member with said body secondary passages and thereby interchange the communication of said inlet and outlet regions with said accumulator chamber and with said second port, and the secondary passages in said body and the secondary passages in said cylindrical member terminating at mating surfaces of the socket and the cylindrical member on a common circle about the axis of rotation of said cylindrical member.

References Cited by the Examiner
UNITED STATES PATENTS

| 1,005,523 | 10/11 | Dunlap | 137—269.5 |
| 1,818,703 | 8/31 | Forman | 137—269 XR |
| 2,335,923 | 12/43 | Dube | 137—270 |
| 2,670,008 | 2/54 | Kopp | 251—205 XR |
| 2,922,432 | 1/60 | Huntington et al. | 137—269.5 |

M. CARY NELSON, *Primary Examiner.*

ISADOR WEIL, *Examiner.*